Figure 1:
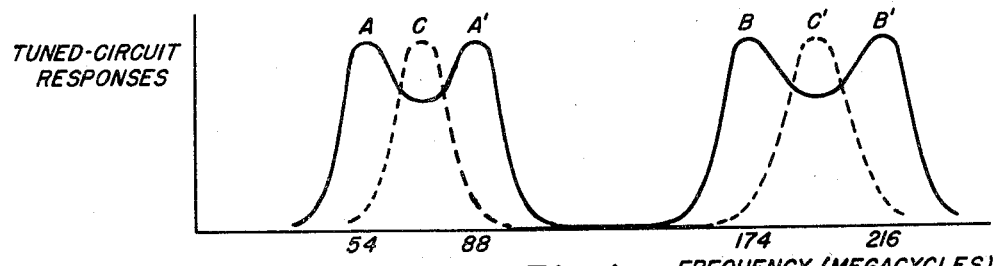

June 7, 1955  B. H. TONGUE  2,710,315
WIDE-BAND AMPLIFYING SYSTEM
Filed Nov. 3, 1950  7 Sheets-Sheet 1

Inventor
Ben H. Tongue
by Rines and Rines
Attorneys

Inventor
Ben H. Tongue
by Rines and Rines
Attorneys

June 7, 1955  B. H. TONGUE  2,710,315
WIDE-BAND AMPLIFYING SYSTEM
Filed Nov. 3, 1950  7 Sheets-Sheet 6

Inventor
Ben H. Tongue
by Rines and Rines
Attorneys

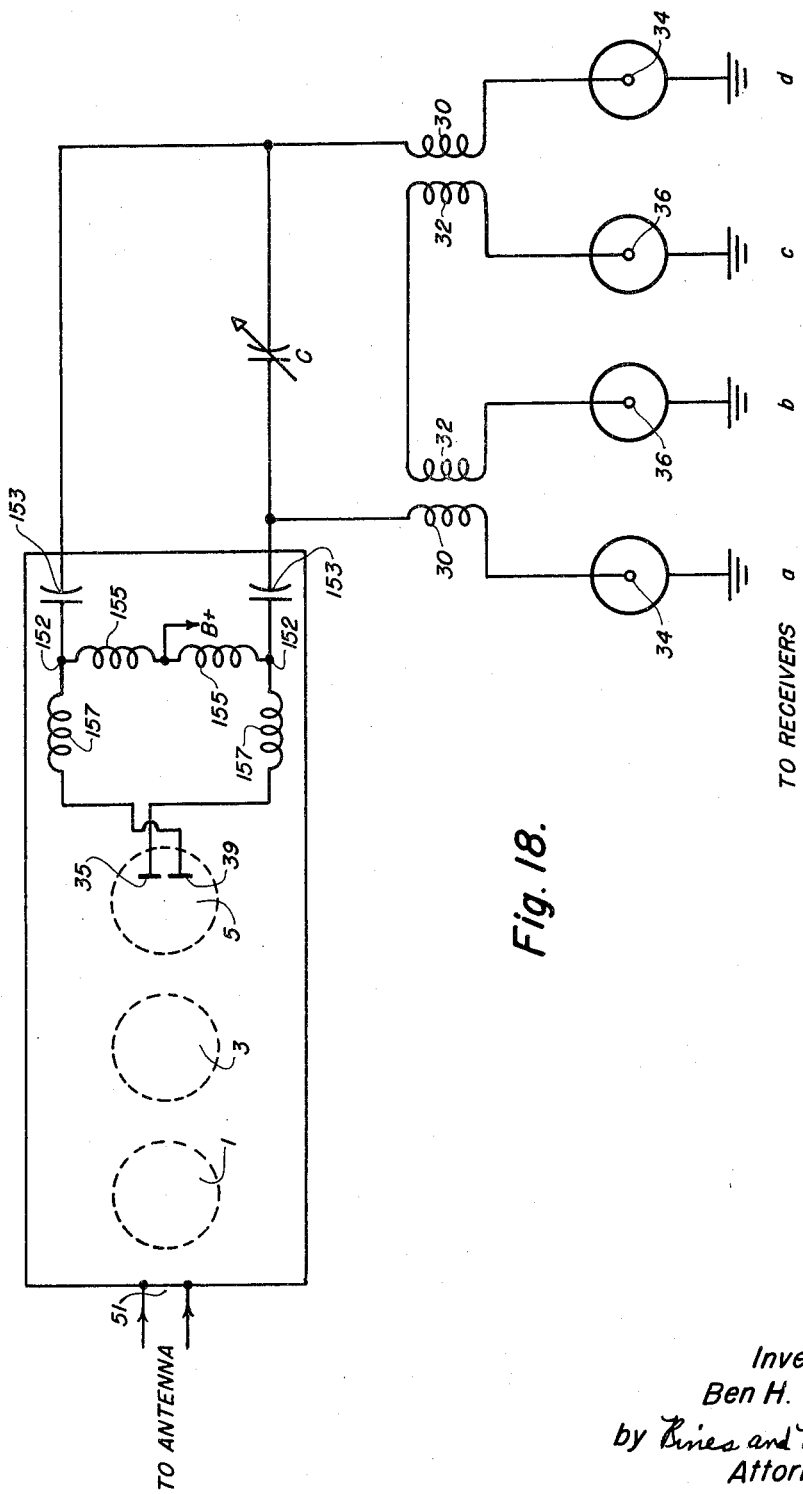

United States Patent Office 2,710,315
Patented June 7, 1955

2,710,315

WIDE-BAND AMPLIFYING SYSTEM

Ben H. Tongue, Mount Vernon, N. Y.

Application November 3, 1950, Serial No. 193,810

10 Claims. (Cl. 179—171)

The present invention relates to broad- or wide-band amplifying systems and, more particularly, to radio-frequency amplifying systems for responding to a plurality of separated broad or wide radio-frequency bands.

An object of the present invention is to provide a new and improved system for amplifying a plurality of separated wide radio-frequency bands.

One of the important applications of the present invention is in the field of television. Various types of broad- or wide-band amplifiers, sometimes called pre-amplifiers or boosters, have been proposed for improving the performance of television receiver sets that must recieve channel frequencies distributed over separated relatively wide radio-frequency bands. This improved performance is required particularly in the so-called "fringe areas," distant from or otherwise disadvantageously located with respect to the transmitting stations. These amplifying devices must amplify the television radio-frequency channel signals occurring in both the low-frequency television band, extending from about 54 megacycles to about 88 megacycles, and the high-frequency television band, widely separated from the low-frequency television band and extending from about 174 megacycles to about 216 megacycles. Since this amplification or signal boosting, moreover, is for the purpose of improving the response of the television or other receiving equipment, the device must be of relatively high quality. It is desired that the amplifier device improve the effective signal-to-noise ratio of the television receiving set, thereby to reduce, for example, the "snow" or flickering appearing upon the television receiver screen. Another object of the amplifier device is to increase the signal strength of all of the channels. Still a further advantage to be obtained through the use of a booster or amplifier device is the reduction in interference from signals other than television channel signals that are often picked up by the television receiver set, such as those emanating from high-frequency communication channels, diathermy machines and the like. Still a further desired result is to provide a good impedance match between the antenna system and the television receiver for all of the channel frequencies.

Among the systems proposed for attempting to achieve these results, are amplifiers embodying pentode vacuum tubes having tuned input and tuned output circuits, one for the low-frequency television band, and the other for the high-frequency television band. The user may switch between either the high- or the low-frequency tuned circuits, and he is required continuously to tune the circuits for each channel frequency. This tuning may be of the moving-core permeability type, or it may embody capacity tuning, sliding-brush inductance tuning, or similar expedients. These systems, however, are all subject to the disadvantage that the user must switch the device when he changes from a channel frequency in the low-frequency television band to a channel frequency in the high-frequency television band, or vice versa. A further disadvantage resides in the fact that the user must continuously tune this system for each particular channel frequency. Impedance matching with the aid of such circuits, furthermore, is optimum at only a single channel frequency.

Another proposal has involved the use of separate coils for each particular channel frequency that are fix-tuned for the individual channel frequencies. While such a system may be better matched to the antenna system than the previously described continuous-tuning systems, it requires the user to switch to the different fixed-tuned circuits in order to receive the different channel frequencies. This puts a serious limitation on the places or locations at which the amplifier may be connected since the user must operate the switching. This type of system, moreover, is expensive and complicated.

Still a further proposal is to use a first broad- or wide-band circuit for the complete low-frequency band, and a second broad- or wide-band circuit for the high-frequency band. This system too, however, requires the switching by the user from the low to the high band, or vice versa.

Another prior-art system involves the use of both a high-frequency band broadly tuned circuit, and a low-frequency band broadly tuned circuit, but obviates the necessity for switching by employing proper electrical lengths of artificial or actual transmission lines from the high- and low-frequency band circuits to the antenna system. A channel frequency lying within the low-frequency band, for example, will then be presented with a high impedance along the path leading to the high-frequency band broadly tuned circuit and a low impedance leading to the low-frequency band broadly tuned circuit. Similarly, a high-frequency band channel frequency will find a path of low impedance to the high-frequency band circuit and a path of high impedance to the low-frequency band circuit. Such systems, of course, require relatively critical transmission-line systems and special electrical components, and are relatively complex.

An additional approach to the problem has been to use distributive amplifiers having their input circuits along one transmission line and their output circuits along a second transmission line to provide substantially uniform response to an extremely wide band of frequencies. Such devices, of course, are very expensive and are not ideally adapted for use as television amplifier or booster stages since they offer no signal discrimination, being broadly responsive to all frequencies, including even those outside the high- and low-frequency television bands.

Another object of the present invention, therefore, is to provide a new and improved system for simultaneously boosting, amplifying or pre-amplifying all frequencies lying within the low-frequency and the high-frequency television bands that shall not be subject to the disadvantages above-mentioned.

A further object is to provide a single electric circuit that presents a substantially uniform low-impedance response or resonant response to a plurality of separated relatively wide frequency bands, and a high-impedance response or high attenuation to frequencies outside the said frequency bands.

An additional object is to provide a radio-frequency amplifying system for producing a substantially uniform broad- or wide-band response to a band of frequencies lying within the range of from about 54 to 88 megacycles, and a substantially uniform broad- or wide-band response to frequencies lying within a band of from about 174 to 216 megacycles, and a high-impedance response or high attenuation to all frequencies intermediate the said bands and on either side of the said bands.

Still a further object is to provide a radio-frequency amplifying system of this character that requires no frequency-band switching and no other adjustments by the user, and that is inexpensive to manufacture and easy to install.

Another object, still, is to provide a device of this character employing standard electrical parts with no special components, and utilizing triode vacuum tubes that not only produce improved gain per unit band width over pentode amplifiers, but permit the manufacture of smaller and less costly units, because two triodes may be embodied in a single-tube envelope.

A further feature of the invention resides in the providing of a unit that may be placed by the unskilled user himself directly at the receiver or at any point remote from the receiver along the antenna system transmission line, or that may be used in connection with television distribution systems.

Still another object is to provide a system employing a minimum number of vacuum-tube stages and electrical components by combining into single stages and networks the function of a plurality of individual stages and networks.

Another feature resides in a novel push-pull amplifier stage and network having a plural resonant response lying in a predetermined radio-frequency band and a single or plural resonant response lying in a widely separated radio-frequency band.

Other and further objects will be explained hereinafter and will be more particularly pointed out in the appended claims.

In summary, the present invention relates to a system for resonantly amplifying a plurality of separated groups of relatively narrow radio-frequency resonant peaks or bands and further resonantly amplifying one or more relatively narrow radio-frequency bands overlapping one or more of the bands of each of the said plurality of groups of bands to produce amplified separated relatively wide radio-frequency bands. Preferred systems, networks and resonant responses are hereinafter treated in detail.

Figure 3:
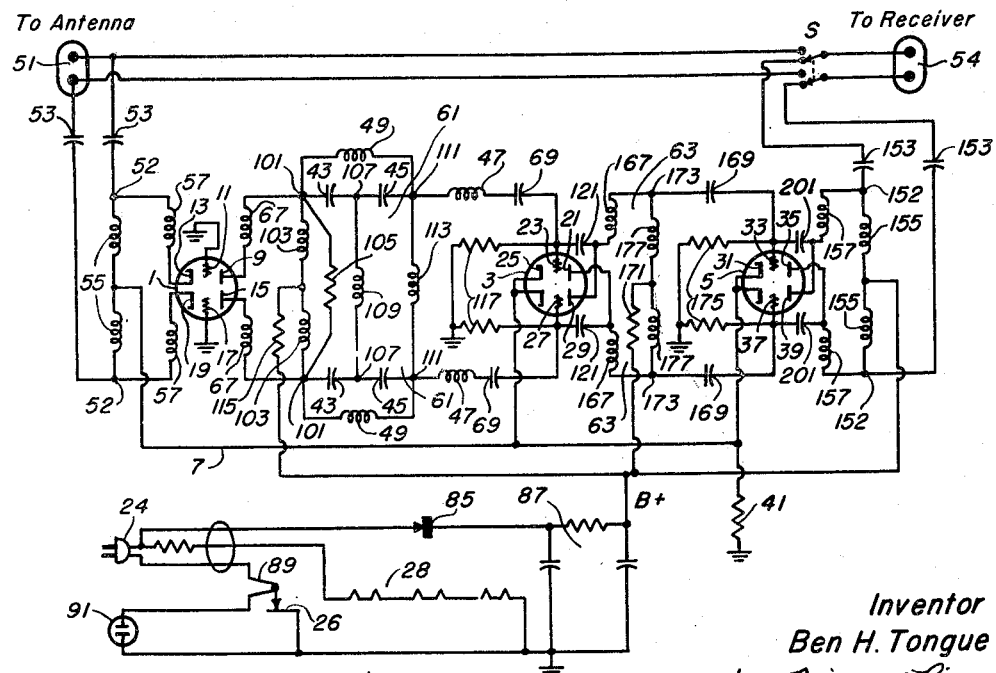
Figure 4:
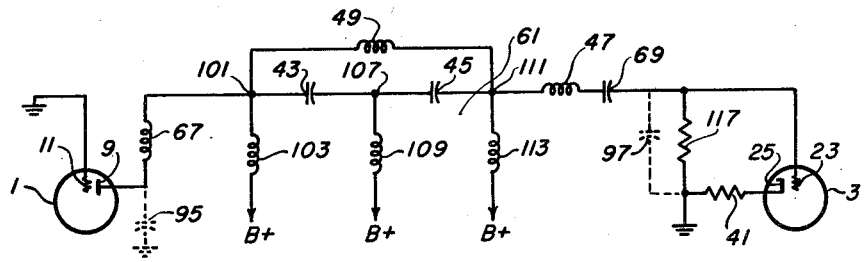
Figure 5:
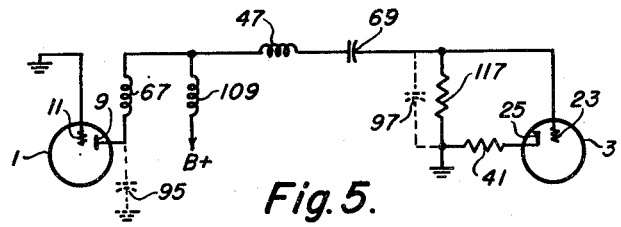
Figure 6:
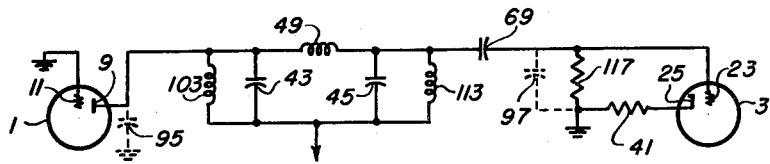
Figure 7:
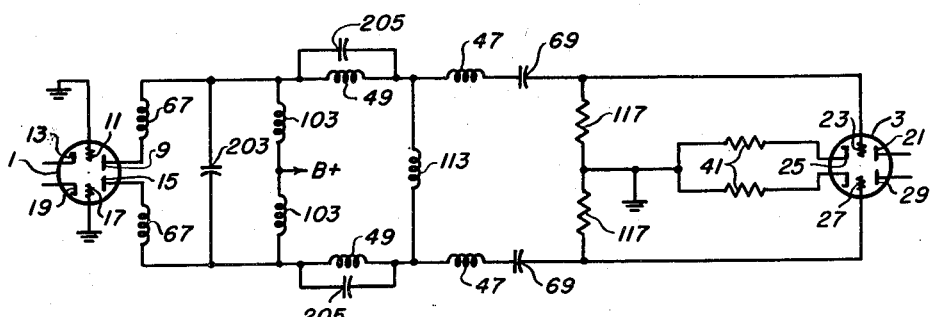
Figure 10:
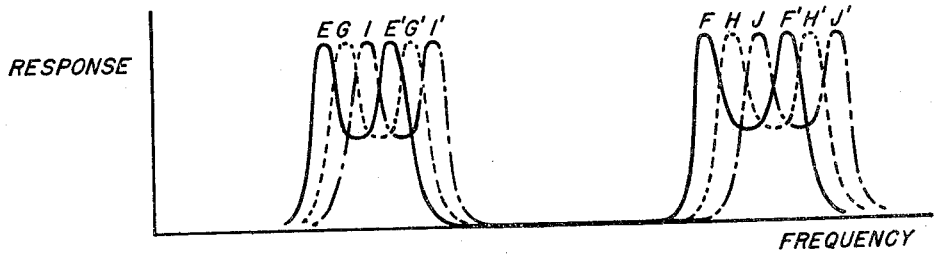
Figure 11:
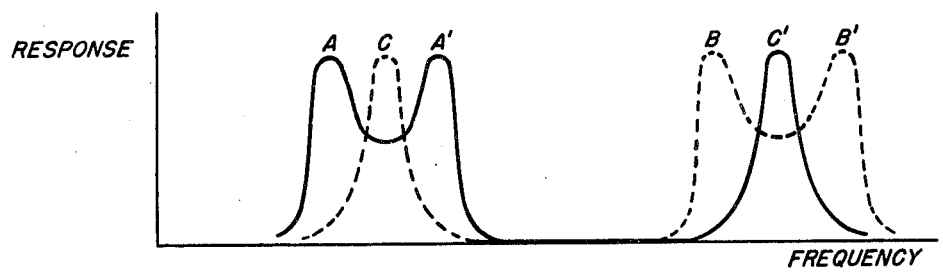
Figure 12:
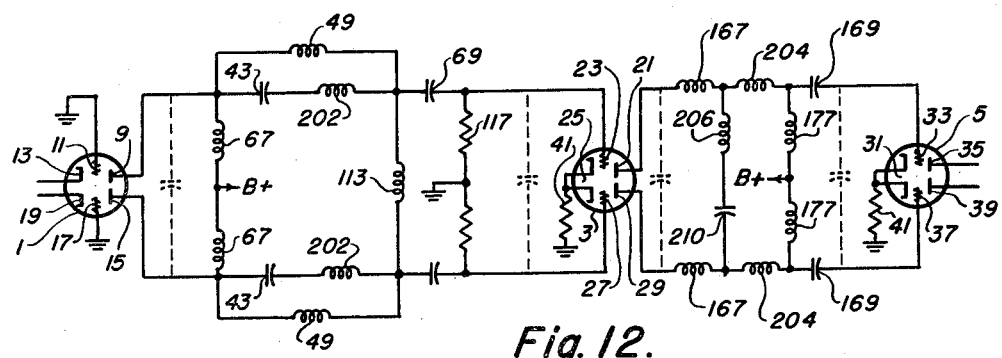
Figure 13:
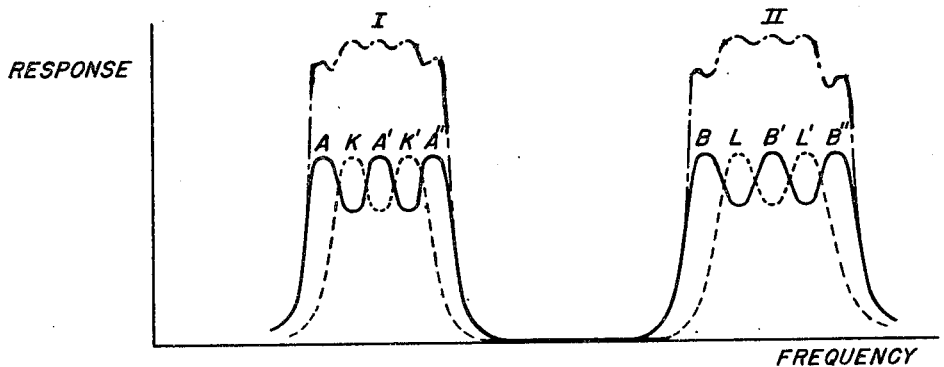
Figure 14:
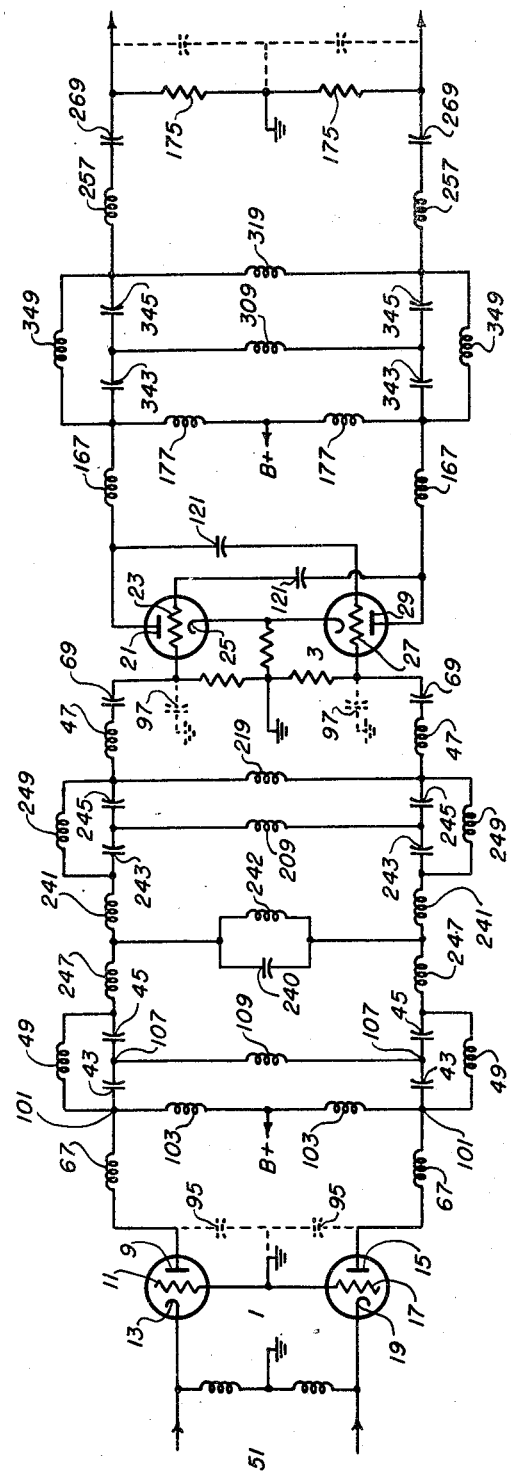
Figure 15:
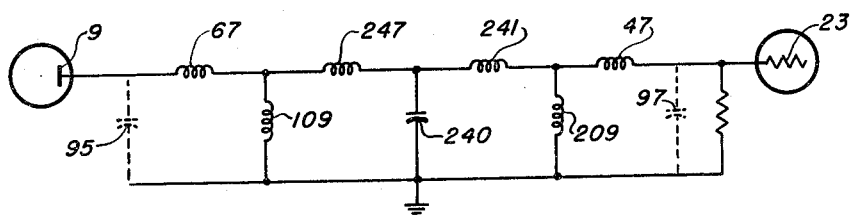
Figure 16:
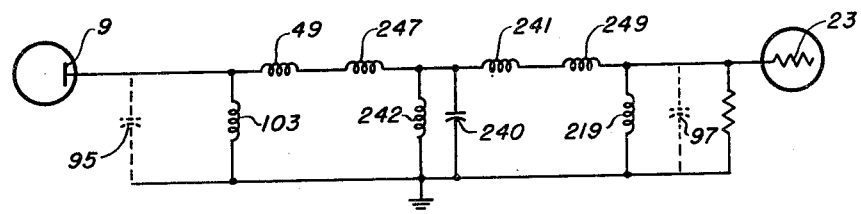
Figure 17:
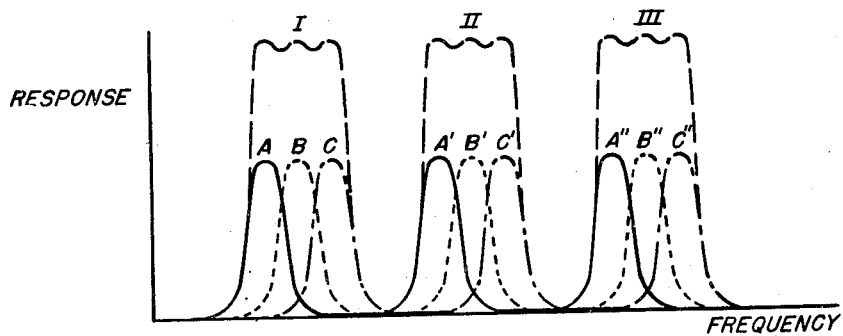

The invention will now be described in connection with the accompanying drawings, Fig. 1 of which is a graph illustrating the combination, in accordance with the present invention, of a plurality of overlapping resonant circuit responses in each of two widely separated frequency bands; Fig. 2 is a curve of the resultant overall response produced by the combination of the individual circuit responses shown in Fig. 1, though not drawn to the same scale as Fig. 1; Fig. 3 is a schematic circuit diagram of a preferred apparatus for producing the overall response illustrated in Fig. 2; Fig. 4 is a simplified schematic circuit diagram of one-half of the network system employed between the first two stages of the electric circuit of Fig. 3; Figs. 5 and 6 are simplified partial schematic diagrams of the equivalent circuit of the network illustrated in Fig. 4 at high and low frequencies, respectively; Fig. 7 is a schematic circuit diagram of a modified network that may be employed between the first two stages of the circuit of Fig. 3; Figs. 8, 10, 11, 13 and 17 are curves illustrating various modified overlapping resonant circuit responses; Fig. 9 is a schematic circuit diagram of a circuit for producing the responses illustrated in Fig. 8 and part of the responses illustrated in Fig. 10; Fig. 12 is a schematic circuit diagram illustrating a modification for producing the responses illustrated in Fig. 11; Fig. 14 is a schematic diagram of a further modified circuit for producing the responses illustrated in Fig. 13; Figs. 15 and 16 are simplified partial schematic diagrams of the equivalent circuit between the first two stages of Fig. 14 at low and high frequencies, respectively; and Fig. 18 illustrates the application of the circuits of the present invention to a distribution system.

In accordance with the preferred embodiment of the present invention, a single network tuned circuit is employed that is of such character as to be resonant to a plurality of frequencies in one frequency-band group, and also resonant to a single or a plurality of frequencies in a second widely separated frequency-band group. As shown in Fig. 1, for example, the network may have a double-resonant peak response to narrow frequency bands A and A' in one frequency-band group, say the low television radio-frequency band or band group of from about 54 to 88 megacycles, and a second double-resonant peak radio-frequency response to narrow frequency bands B and B' in the widely separated high television radio-frequency band or band group of from about 174 to 216 megacycles. The narrow resonant peak frequency bands A and A' in the relatively wide low radio-frequency television band and the narrow resonant peak frequency bands B and B' in the relatively wide high radio-frequency television band may, for some applications, produce a sufficient broad-band response to both the low and high radio-frequency bands. The dips between the narrow resonant peak frequency bands A and A' in the low radio-frequency television band and between the peaks B and B' in the high radio-frequency television band, however, are objectionable in some applications.

It has been found desirable, for example, for the purpose of amplifying the low-channel and high-channel present-day television bands received by the present-day commercial television receiver, to provide an additional circuit network that has a resonant response C to the narrow band of frequencies lying in the region of the dip between the narrow resonant bands A and A' in the low radio-frequency television band, and a resonant response to the frequencies in the dip between the resonant frequencies B and B' in the high radio-frequency television band, as illustrated at C'. The overall response of these two network tuned circuits, producing the resonances A, A', B, B' and C, C', is illustrated in Fig. 2, having but minor dips 8 and producing substantially uniform response over the complete low and high radio-frequency television bands, while producing substantially no response to frequencies outside of these bands.

The use of a network tuned circuit having the responses A, A' and B, B', which may be combined with the overlapping responses C, C' of a second network, obviates the necessity for having three staggered tuned sets of networks. By the expedient of the present invention, therefore, a single network produces the two responses A, A' in the low radio-frequency band and the two responses B, B' in the widely separated high radio-frequency band, thereby combining the responses of two separate networks having, for example, the respective resonant responses A, B and A', B'. A less expensive apparatus is thus produced that employs fewer vacuum tubes and fewer electrical components, while providing the desired substantially uniform response over, for example, both the low and high radio-frequency television bands, and the rejection of all frequencies lying outside of these bands.

Figure 2:
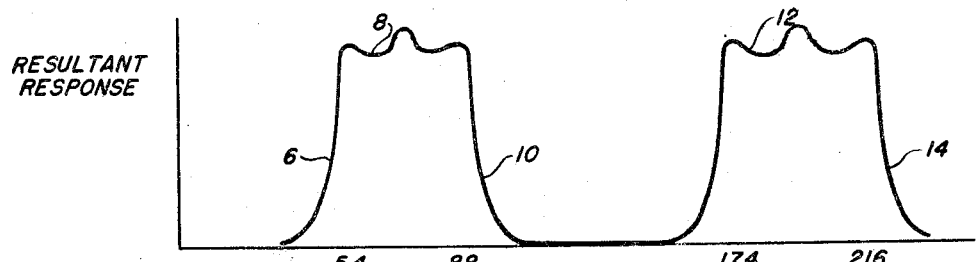

It remains to explain what type of network circuits may be employed to produce the responses illustrated in Figs. 1 and 2. A preferred system embodying appropriate network tuned circuits is illustrated in Fig. 3. While the system of Fig. 3 will hereinafter be discussed in connection with television reception, it is to be understood that this is illustrative only, the invention being broadly applicable to any type of system of the nature described. The embodiment of Fig. 3 employs three double triode vacuum tubes shown at 1, 3 and 5. For purposes of illustration, the tubes are schematically shown as vertically disposed so that one section of each double triode may be referred to as the upper triode section, and the other section, as the lower triode section. The upper triode section of the double triode 1, for example, is provided with a plate or anode 9, a control grid 11, shown grounded, and a cathode 13. The lower section of the double triode 1 is provided with a plate or anode 15, a control grid 17, also shown grounded, and a separate cathode 19. The double triode 3 is similarly provided with an upper triode section comprising a plate or anode 21, a control grid 23 and a cathode 25, and the lower triode section embodies a cathode strapped to the cathode 25 and, therefore, always maintained at the same potential as the cathode of the upper triode section, a control grid 27, and a plate 29. The double triode 5 is similarly provided with strapped cathodes 31 and upper and lower triode-section control grids and plates or anodes 33, 35 and 37, 39, respectively. It is to be understood, of course, that separate triodes in separate envelopes may be employed instead of the above-described double-triode tubes, though such a construction is considerably more expensive and space-consuming than the system illustrated in Fig. 3. Other types of tubes besides triodes may also be employed but triodes, for reasons that will hereinafter be discussed, are deemed preferable for the purposes of the present invention.

The pairs of upper and lower sections of each of the double triodes 1, 3 and 5 are connected in push-pull. Radio-frequency energy from an antenna system, for example, is fed in anti-phase from the terminals 51, representing any desired point along the antenna system transmission line, to the input circuits of the upper and lower triode sections of the tube 1, as will later be explained. The resulting outputs in the plate circuits of the first pair of push-pull-connected upper and lower triode amplifier stages 1, are, therefore, anti-phase signals, that, in turn, are fed to the corresponding input circuits of the second pair of push-pull-connected upper and lower triode amplifier stages 3. The push-pull outputs of the triode amplifier stages 3, are similarly fed to the corresponding input circuits of the third pair of push-pull-connected upper and lower triode amplifier stages 5, and the push-pull outputs of the triode amplifier stages 5 are, in turn, fed to the output terminals 54 for connection, ultimately, to a receiver, such as the conventional present-day television receiver. The upper and lower terminals 51 may, for example, represent a point directly at the antenna system, a point between the antenna system and the receiver, or a point directly at the receiver. The user may, though entirely unskilled, install the circuits of the present invention by, for example, cutting out a section of the antenna transmission line and connecting the remaining ends of the transmission lines to the terminals 51 and 54.

The switch S may permit the antenna system to feed directly through terminals 51 and 54 to the receiver, by-passing the circuit of Fig. 3 when the switch is in the up position. When boosting or further amplification is desired, however, the signal may be passed from the terminals 51 through the circuit of Fig. 3 to the terminals 54 by operating the switch S to its down position, as shown. With the switch S in its down position, the terminals 51 are connected through direct-current blocking condensers 53 to the upper and lower terminals 52 of the input circuit of the system of Fig. 3. The terminals 52 are connected to opposite ends of a center-tapped choke coil 55. The center tap is shown connected to ground by a conductor 7 through a resistor 41. The two sections of the coil 55 provide tight magnetic coupling such that the signal appearing at the upper and lower terminals 51 and fed through the upper and lower blocking condensers 53 are balanced with respect to the grounded center tap of the coil sections 55. The terminals 52 are connected through series-connected coils 57 to the respective cathodes 13 and 19 of the upper and lower triode sections of the double triode 1. The before-described ground connection of the control grids 11 and 17 is effectively connected through ground to the center tap of the choke-coil sections 55. These choke-coil sections 55 are adjusted to values such that at channel frequencies in the low radio-frequency television band, they will resonate broadly with the grid-cathode capacitance of the upper and lower sections of the double triode 1 and the distributive capacitance in the input circuit from the terminals 51. For channel frequencies located in the high radio-frequency television band, on the other hand, the values of the coupling coils 57 are adjusted to present, in conjunction with distributive capacitance of the input system and the grid-cathode capacitance of the upper and lower triode sections of the double triode 1, a π-type coupling network having an input impedance of, for example, about 300 ohms, to correspond to the conventional 300-ohm transmission line that may be connected to the terminals 51. Transmission-line reflections are thus minimized. The direct-current coupling condensers 53, moreover, are adjusted to values such that they effectively produce a type of series resonance in connection with the coils 57, which is not strictly series resonance because of the presence of the coils 55, thereby to produce best results in the low radio-frequency band. By this expedient, an excellent compromise is effected that permits a good impedance match of the antenna system and transmission line to the tube 1 for all frequencies lying within both the low and high radio-frequency bands.

The use of the upper and lower grounded grid triode sections introduces a low noise figure into the system and simplifies the problem of matching the tube 1 to the antenna system. The input impedance of such a device is approximately equal to the inverse of the transconductance of the tubes, which in turn, is of the order of 150 ohms, so that a balanced input impedance of 150 ohms to ground is presented for both the upper and lower sections of the tube 1, matching the 300-ohm line, before referred to. This is another of the advantages of the use of triodes.

It is in the output circuits of the first pair of upper and lower push-pull connected triode amplifier stages 1, that a pair of similar coupling networks 61 are provided that produce similar plural or double resonance effects in both the low and high radio-frequency bands, as before described. The output circuit coupling networks 61 of the triode amplifier stages 1, for example, may be of such a nature, as to produce the double resonance response to the two separated pairs of narrow radio-frequency bands A, A', and B, B' illustrated in Fig. 1 with the peaks of the pair of narrow frequency bands A, A' occurring at frequencies lying intermediate the low radio-frequency band, and the peaks B, B' occurring at frequencies lying intermediate the widely separated high radio-frequency band. The outputs of the networks 61 are then fed to the second pair of upper and lower push-pull connected triode amplifier stages 3 in the output circuits of which a further pair of coupling networks 63, similar to each other, is provided. This further pair of networks 63 is, in turn, of such a nature as to provide a further double resonant response, say, for example, of the type illustrated at C, C' in Fig. 1. The peaks of the relatively narrow separated frequency bands C and C', occurring also at points intermediate the low and high radio-frequency bands, respectively, are displaced with reference to the resonant-peak narrow-band responses of the networks 61 in order to overlap the responses produced by the coupling networks 61 in the regions of the dips between the double responses A, A' and B, B'. The overall or resultant amplified response produced, therefore, by the circuits 1, 61 and 3, 63, is then fed to the third pair of push-pull connected triode amplifier stages 5 the output circuits of which, as later explained, are broadly tuned. In this manner, the resultant or overall response in the output circuit of the third pair of push-pull connected amplifier stages 5 is of the nature illustrated in Fig. 2, providing broad or wide-band response to all the low radio-frequency band channel frequencies and to all the high radio-frequency band channel frequencies, but highly attenuating all the frequencies external to the said widely separated high and low radio-frequency bands.

It is next in order to explain the details of the circuits that produce these plural resonance results. The plates or anode 9 and 15 of the first pair of upper and lower push-pull connected triode amplifiers 1, are respectively shown connected through series-connected coils 67 to pairs of series-connected network condensers 43, 45, and thence through series-connected coils 47, and coupling condensers 69, to the control grids 23 and 27 of the second pair of upper and lower push-pull connected triode amplifiers 3.

The control grids 23 and 27 are shown connected through similar resistors 117 to ground, and the common cathodes 25 of the pair of triodes 3 are connected through the resistor 41, also, to ground. Shunting the network series-connected condensers 43 and 45 are further coils 49. Between the junctions 101 of the coils 67 and the series-connected condensers 43, above described, a pair of similar series-connected coils 103 are connected. Between the junctions 107 of the series-connected condensers 43 and 45, a further coil 109 is connected, and between the junctions 111 of the condensers 45 and the series-connected coils 47, still a further coil 113 is provided. B+ plate supply voltage may be fed through a loading resistor 115 to the junction between the series-connected coils 103 in order to supply plate voltage to the amplifier stages 1.

This B+ voltage may be produced by feeding alternating-current voltage from an alternating-current line through a plug 24 that may be used to energize an outlet 91 into which the conventional television set may be plugged. One terminal of the alternating-current voltage plug 24, shown as the upper terminal, is connected through a rectifier 85 such as, for example, a selenium-type dry rectifier, and through a π-type condenser-resistor filter network 87 to produce the B+ voltage. This same side of the alternating-current voltage line is connected through a resistor in series with the filaments 28 of the tubes 1, 3 and 5, to the ground or negative side of the plate supply system. From the other or lower terminal of the alternating-current voltage inlet plug 24, current may be passed through a relay such as a bi-metal thermo-element relay 89 to the ungrounded side of the outlet 91. When the television set is turned on, the system of Fig. 3 is automatically also turned on. This is because, upon turning on the television set, current flows through the bi-metal relay 89 causing it to bend into contact with a contactor 26 that is connected to the grounded side of the plate supply system, thereby feeding filament current to the filaments 28 of the tubes 1, 3 and 5, and supplying the desired B+ voltage for the stages 1, 3 and 5. It is to be understood, of course, that any other conventional plate and filament supply may, of cource, be employed to energize the tubes 1, 3 and 5.

Since the output circuits of all three pairs of amplifier stages 1, 3 and 5 are symmetrical with respect to ground, it will suffice to explain only the performance of one of the stages, say, the upper triode section, since the operation of the other stage or section is the same, though in anti-phase. The coupling network between the upper sections of the push-pull amplifiers 1 and 3 have, therefore, been re-drawn in simplified form in Fig. 4 to illustrate one-half of the symmetrical push-pull system, and thereby to facilitate explanation of the operation of the invention. It will be noted first that no neutralizing condensers are employed in the output circuits of the amplifier stages 1. The use of the grounded-grid triode, before described, obviates the need for neutralization.

A dotted capacitor 95, Fig. 4, is shown connected from the plate 9 of the upper triode stage of the push-pull amplifiers 1 to ground, and a similar dotted capacitor 97 is illustrated connected between the control electrode 23 of the upper section of the push-pull amplifier stages 3, to ground. These capacitors 95 and 97 are dotted since they represent, respectively, the effective plate-to-grounded-grid capacitance of the upper section of the double triode 1, and the grid-to-grounded-cathode input capacitance of the upper section of the double triode 3. The capacitance values of the capacitors 95 and 97 are, for triodes, roughly of the same order of magnitude.

The series-connected network condensers 43 and 45 are made of such value that they present extremely low impedance to frequencies lying within the high radio-frequency band so that they may, for purposes of this discussion, be considered as substantially short-circuited at those frequencies. The coils 103, 49 and 113 are made of sufficient inductance that at the same high frequencies they present extremely high impedances, and for purposes of the present discussion, may be considered as open-circuited at the high-channel frequencies. The network system coupling the first and second stages 1 and 3 at the high-channel frequencies, therefore, behaves substantially as if it had the form illustrated in Fig. 5. The equivalent circuit of Fig. 5 will be recognized as of the T-inductively coupled double-tuned type having narrow resonant responses of substantially the same magnitude at two separated frequency bands shown, for example, at B and B′ in Fig. 1.

At low-channel frequencies, however, the inductance 109, which is of value considerably less than the previously described inductors 49, 103, 113, may be treated as of extremely low impedance and hence, a short-circuit. The inductors 47 and 67 are similarly small and may be similarly ignored. The larger coils 103, 49 and 113, however, and the condensers 43 and 45 present finite impedances to the frequencies located in the low radio-frequency band, so that the network 61 behaves as if of the form illustrated in Fig. 6. The equivalent circuit is effectively a pair of parallel-connected coils and condensers 43, 103 and 45, 113 interconnected by a series-connected coil 49. This circuit will be recognized as of the π-inductively coupled double-tuned type producing, therefore, two similar resonant responses to two separated narrow frequency bands in the low radio-frequency band, as shown, for example, at A, A′ in Fig. 1. By proper adjustment, the magnitude of the responses A, A′ may be made substantially the same as the magnitude of the responses B, B′.

There thus result in the output circuits of upper and lower push-pull amplifiers embodied in the envelope 1, tuned-circuit responses having the characteristics illustrated at A, A′ and B, B′. These responses have been produced, moreover, by a single complex network used as the output circuits of a single double triode stage 1. The only other element present in the output circuits of the pair of stages 1 that has not yet heretofore been discussed, is the resistor 105 shunting the coils 103. This resistor loads the plate circuit of the pair of upper and lower push-pull triode amplifiers 1, reducing the Q thereof and also reducing the tendency for regeneration. As before mentioned, since the components of the networks comprising the output circuits of the upper and lower triode sections of the amplifiers 1 are similar and symmetrical, a balanced push-pull system is provided with similar, but anti-phase, signals appearing in the output circuits.

These network output circuits 61, as before described, are connected to the input circuits of the second pair of push-pull amplifier stages 3 which are of relatively high impedance. The double triodes of the stages 3 require neutralizing condensers 121 between the control grid of each section and the plate of the other section. Further networks are provided in the output circuits of the amplifier stages 3 to provide resonance to frequencies lying within the dips between the peaks A, A′ and B, B′ in the response of the networks 61. It is the preferred requirement of these networks, therefore, that they produce a resonant response to two relatively narrow widely separated radio-frequency bands, one in the low-channel television band, and one in the high-channel television band, that overlap the dips in the double resonant response of the networks 61 of the preceding push-pull stages. While it is not essential that the overlapping take place in the dips of the responses A, A', B, B', this is preferred where the most uniform and flat resultant response is desired.

A preferred double-resonant circuit for resonantly amplifying two relatively narrow widely separated frequency bands is shown in Fig. 3 at 63. The plates 29 and 21 of the lower and upper sections of the push-pull amplifiers 3 are shown connected through series-connected coils 167 to a pair of similar series-connected coils 177. The plate 29 of the lower section is thus connected through the upper coil 167, through the upper and lower coils 177 and through the lower coil 167 to the plate 21 of the upper section of the double triode 3. The B+ plate-supply voltage is fed through a load resistor 171 to the junction of the series-connected coils 177. The upper and lower junctions 173 of the coils 167 and 177 are connected through coupling condensers 169 to the control electrodes 33 and 37 of the upper and lower push-pull amplifiers 5. The control grids 33 and 37 are connected to ground through grid-leak resistors 175.

Since the output circuits of the second pair of stages 3 are symmetrical with respect to ground, it will again suffice to explain only the performance of, say, the upper triode section since the operation of the lower triode section is the same, though in anti-phase. The response of the networks 63 to frequencies lying in the low-channel and high-channel television bands may be understood from the following considerations.

For frequencies lying in the low-channel frequency band, the reactance of the coil 167 is adjusted to be small compared to the reactance of the plate-to-grid and plate-to-cathode capacitance of the upper triode section of the stages 3. The inductance 177 may be made larger than the inductance of the coils 167. There is thus produced at the frequencies in the low radio-frequency band, a first peak or resonance somewhere in that band resulting from the resonating of the output capacitance of the upper section of the double triode 3 and the grid-to-cathode capacitance of the upper section of the amplifiers 5 with the larger inductance 177. This tuned circuit is preferably adjusted, as before described, to a value intermediate the limits of the low-channel frequency band, at the points of the dip in the low-channel frequency response A, A' of the preceding network 61, thereby overlapping the right-hand side or portion of the response peak A and the left-hand side or portion of the response peak A', as shown at C. The coupling condensers 169 are of much larger capacitance than the interelectrode capacitances above referred to, so that they may be neglected insofar as their effect upon the low-frequency resonating of the network 63. For frequencies in the high-frequency band, on the other hand, the reactance of the inductance 177 is sufficiently greater than the reactance produced by the grid-to-cathode capacitance of the upper stage of the amplifiers 5, that the interelectrode capacitance of the upper stage of the amplifiers 3 operates with the smaller inductance 167 and the grid-to-cathode capacitance of the upper stage of the amplifier 5 as a mis-terminated low-pass filter having its characteristic peak just below its filter cut-off frequency adjusted, preferably, to occur somewhere intermediate the high-frequency band, say at the point C', Fig. 1. This fills in the dip in the high-frequency response B, B' of the networks 61, overlapping the right-hand side or portion of the peak response B and the left-hand side or portion of the peak response B'. Mis-termination of this effective low-pass filter arises from the fact that the grid-to-cathode resistance 175 of both sections of the third stages 5 is made of value higher than the impedance of the coils 167 and the impedance of the inter-electrode capacitances, above referred to, in the high-frequency band. In networks of the type illustrated at 63, moreover, the low- and high-frequency resonant peaks C and C' are substantially the same magnitude, and may, therefore, be adjusted to be of substantially the same magnitude as the peaks A and A' and B and B' produced by the networks 61. The networks 63, furthermore, are heavily loaded, having a low Q, and their input circuits comprising the triode stages 3 present a high impedance compared with the impedance of the networks, the stages 3 operating as substantially constant-current sources.

There is thus produced for application between the control grids 33 and 37 and the cathodes 31 of the upper and lower triode sections of the amplifiers 5, the resultant of the resonant amplification produced by the network stages 1, 61 and 3, 63. This resultant of the resonant amplification by successive circuits having the responses A, A', B, B' and C, C', above described, has been found to provide an excellent practical wide-band circuit for amplification of the complete low-frequency television band and for amplification of the complete high-frequency television band with substantially uniform gain, and with excellent rejection of all frequencies lying outside the said bands.

The output circuits of the final stages 5 are substantially identical in character to the input circuits of the stages 1, previously described, and of the same form as the output circuits of the stages 3, though somewhat differently tuned. The coils 155 correspond to the coils 55 discussed in connection with the input circuits of the stages 1, and to the coils 177 of the stages 3. The coils 157 correspond to the coils 57 in the input circuits of the amplifiers 1, and to the coils 167 in the output circuits of the amplifiers 3. The junction between the series-connected coils 155 is connected to the B+ plate-supply terminal in order to supply plate voltage to the stages 5. The upper terminal 152 between the upper coils 157 and 155 is connected through a coupling condenser 153 to a switch contact member of the switch S, and the lower junction 152 between the lower coils 157 and 155 is connected through a similar coupling condenser 153 to a similar terminal of the switch S. When, therefore, it is desired to operate the system of Fig. 3 and the switch S is thrown to the down position, shown, the condensers 153 are connected to the terminals 54 that, in turn, are connected to, for example, the television receiver. The values of the elements 157 and 155 are similar to those of the elements 55 and 57 before discussed in connection with the amplifier stages 1, providing a broad or wide-band resonant electric circuit for passing the resultant response of Fig. 2 produced by the stages 1, 61, and 3, 63, and providing a proper impedance at the terminals 54 for matching the impedance of the receiver or other ultimate output system. Neutralizing condensers 201 are shown connected between the grid of each section of the stages 5 and the plate of the other section.

The commercial circuit has been constructed as shown in Fig. 3, embodying 12AT7 double triodes 1, 3 and 5, and a response of the type illustrated in Fig. 2 has been produced. The elements of the network 61 were adjusted, as before described in detail, to produce the double-peak resonances A, A' in the low-frequency band at the respective peaks of about 54 and 88 megacycles, and to produce the characteristic double peaks B, B' in the high-frequency band, at frequencies of about 174 and 216 megacycles, respectively. The elements of the networks 63 were adjusted, as also explained above, to produce resonant peaks C, C' at respective frequencies of about 70 megacycles and 200 megacycles. Below about 54 megacycles, the gain of the system dropped sharply as indicated at 6, Fig. 2. A high-gain, substantially flat or uniform response of above 20 decibels was produced over the complete low-frequency band of from about 54 to 88 megacycles as shown at 8. Beyond about 88 megacycles, the system highly attenuated radio-frequency energy, as shown at 10. At about 174 megacycles, the system again responded with high gain of from about 18 to about 21 decibels over the high-frequency band of from about 174 to 216 megacycles, as shown at 12, rapidly attenuating frequencies above 216 megacycles as indicated at 14. This, as before mentioned, has been found to produce a most satisfactory practical system for amplifying the high- and low-frequency present-day television bands.

If the system illustrated in Fig. 3 is to be connected directly at the antenna or at some intermediate point along the transmission line remote from the receiver, furthermore, a pair of loading resistors, not shown, may be connected in series across the switch S between the terminals 54. These resistors may, for example, have a value of 150 ohms for presenting a match to a 300-ohm transmission line connected to the terminals 54.

If on the other hand, it is desired to connect the system illustrated in Fig. 3 directly to the receiver, such loading resistors would not be necessary. In some receivers, however, the antenna and transmission-line impedances are used in connection with the receiver input impedance to provide proper receiver bandwith. In such cases, loading resistors would be desirable. The amplifier stages 5 are operated, furthermore, as low gain stages, and, since the loading resistance provided by the receiver connected to the terminals 54 is low, the amplifier stages 5 have a substantially broad or flat response over the complete high- and low-frequency bands, as before explained.

It is to be understood, furthermore, that other types of plural or double-tuned coupling networks than the specific types illustrated at 61 and 63 may be employed to couple the stages 1, 3 and 5. As another illustration, a modified circuit for producing double-peak low- and high-frequency-band resonance is illustrated in Fig. 7, having a form somewhat different than that of the networks 61. The input circuits of the triode amplifier stages 1 and the output circuits of the triode amplifier stages 3 are not shown in order not to complicate the disclosure, it being understood that they may, for example, be the same as those illustrated in Fig. 3. The networks coupling the amplifier stages 1 and 3 bear some similarity to the networks 61, however, embodying the series-connected coils 67, 49 and 47, and also the coils 103 and 113 of the networks 61. A condenser 203 is connected across the coils 103, and a single condenser 205 is shunted across each coil 49. The upper and lower symmetrical networks of Fig. 7 produce a response very similar to the response A, A' and B, B' illustrated in Fig. 1, but the reasons for this response are quite different from those previously discussed in connection with the different networks 61. At frequencies in the high-frequency television band, the coils 103 and 113 are of sufficient value to present a very high impedance and the condenser 205 is such as to present effectively a short circuit. The equivalent circuit, insofar as the high-frequency response is concerned, then comprises the series-connected coil 67, the shunt condenser 203, the series-connected coil 47, and the shunt capacities presented by the grid-to-plate capacitance of the amplifiers 1 and the grid-to-cathode capacitance of the amplifiers 3. Such a circuit is, in effect, a two-stage low pass filter of the constant K-circuit type, which normally has a flat response to all frequencies up to the cut-off frequency at which point the response drops sharply. By mistermination such a filter circuit, however, as by loading it with an impedance higher than its characteristic impedance, the response near the cut-off frequency of the filter becomes peaked. Since this is a two-stage filter, moreover, a pair of peaks will be produced near the cut-off frequency of the filter. By making the inductance 103 quite small, moreover, the normal response of the filter to frequencies below cut-off frequency will become modified, so that the filter does not pass these frequencies with appreciable amplitude. In the system of Fig. 7, the mistermination is provided by the input impedance of the push-pull triode amplifiers 3 which is made considerably greater than the characteristic impedance of the effective filter network. There are produced at the high frequencies, therefore, resonant responses to two narrow high-frequency bands near the cut-off frequency of the filter, and substantially negligible response to all other frequencies. With proper values of components, of course, the effective cut-off frequency of the effective high-frequency filter may be made to occur in the neighborhood of about 216 megacycles so that the network of Fig. 7 presents, in the high-frequency television band, a response quite similar to that indicated at B, B' in Fig. 1.

At frequencies in the low-frequency television band, however, the relatively small inductors 67 and 47 may be considered of negligible impedance and the condenser 205 will have very high impedance. The effective low-frequency circuit, therefore, comprises the parallel condenser-coil circuit 203, 103, the series branch coil 49 and the parallel coil 113, shunted on one side by the output capacitance of the amplifiers 1, and on the other side by the grid-to-cathode capacitance of the amplifiers 3. The circuit then reduces to the equivalent double-triode inductively coupled type previously discussed in connection with the system of Fig. 6, providing a pair of resonant responses A, A' in the low-frequency band.

Every television channel frequency, therefore, and only such channel frequencies lying within the limits of both the low- and high-frequency television band will thus, in accordance with the present invention, be amplified in the overall manner illustrated in Fig. 2, providing for the simultaneously amplification of all the television channels without switching mechanisms or other undesirable circuitry. In accordance with the present invention, furthermore, the function of plural stages to produce plural resonance in each of a plurality of widely separated frequency bands is provided by a single push-pull stage, thereby reducing the number of stages necessary to provide a flat response to both the high- and low-frequency television bands.

It is not, of course, necessary that the double resonant networks 61 of Fig. 3 or the corresponding networks of Fig. 7, or any similar networks, be turned to respond to a pair of frequencies at the extremities of the high- and low-frequency bands, as shown at A, A' and B, B'. They may be tuned to frequencies more intermediate the bands, as later discussed. It is not necessary, furthermore, that a network of the type shown at 63 be employed to fill in the dips of the responses A, A' and B, B' with a single resonance in both the low- and high-frequency bands. A flat resultant response over the low- and high-frequency bands may, as a further illustration, be obtained by circuits producing the individually tuned-circuit responses illustrated in Fig. 8. A first circuit may, for example, produce a double-resonant response E, E' in the low-frequency band and a double resonant response F, F' in the high-frequency band, where the responses E and F are respectively at the low ends of the low- and high-frequency bands, and the responses E' and F' are at frequencies intermediate the limits of the low- and high-frequency bands. A circuit having such a response may be followed by a further circuit having a response G, G' in the low-frequency band, and a response H, H' in the high-frequency band. The responses G and H may occur, also, at points intermediate the low- and high-frequency bands, overlapping the dips between the respective peaked responses E, E' and F, F', while the responses G' and H' may occur at the upper limits of the low- and high-frequency bands, overlapping the falling or right-hand sides or portions of the responses E' and F'. Inasmuch as four individual narrow resonances are combined in the response illustrated in Fig. 8, a somewhat flatter overall response may be produced than is illustrated in Fig. 2 where but three resonant responses are combined.

Figure 8:
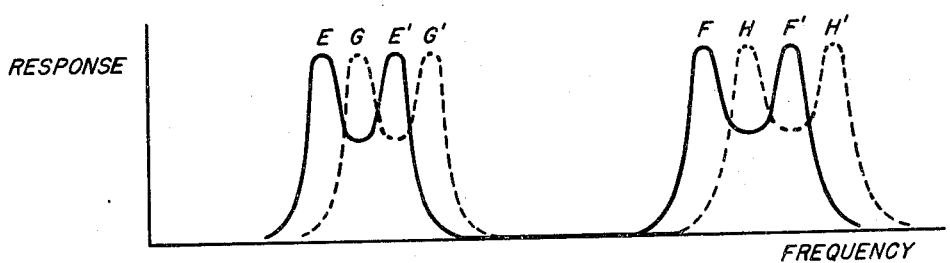
Figure 9:
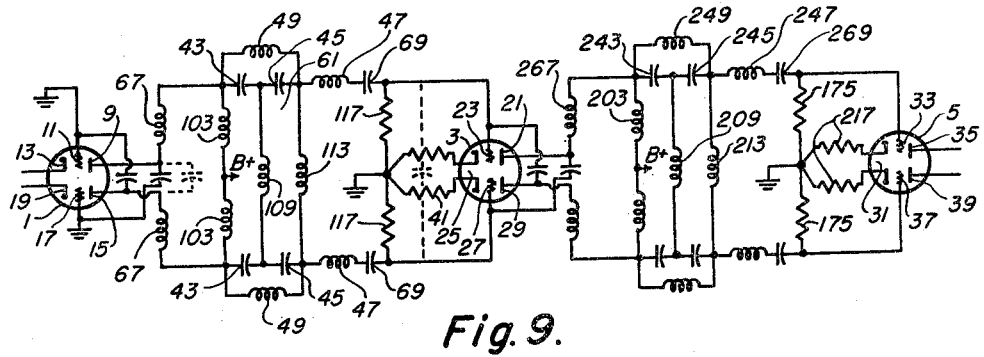

A circuit for producing the groups of responses E, E', F, F', G, G' and H, H' of Fig. 8 is illustrated in Fig. 9, wherein it is again to be understood that the input circuits of the amplifiers 1 and the output circuits of the amplifiers 5 are not shown since they may be of the same nature illustrated in Fig. 3. The output circuits of the amplifier stages 1 are precisely of the same nature illustrated in Fig. 3, but the elements 67, 103, 109, 113, 43, 45, 47 and 49 are tuned so that the second peak responses E' and F' produced, respectively, in response to frequencies in the low-frequency and the high-frequency television bands, occur at points intermediate the bands. The amplifier stages 3, instead of being provided with a circuit for producing a single resonant response in each of the low- and high-frequency bands, as illustrated at C, C', are provided with networks of the same character as the networks 61, but tuned slightly differently to provide the overlapping double responses G, G' and H, H'. The elements of the networks in the output circuits of the amplifiers 3 shown in Fig. 9 correspond to the elements in the output circuits of the amplifiers 1, and are, therefore, given the same numbering except prefixed by the numeral 200. It may be observed that neutralizing condensers are shown employed in both the first and second push-pull amplifier stages 1 and 3, and interelectrode capacitances are shown dotted.

It is, of course, possible to employ more than two pairs of network stages for producing double-resonant characteristics in both the low- and high-frequency bands. The response indicated in Fig. 10, for example, comprises double-resonant responses produced by successive networks of the type 61 at the respective peaks E, E', F, F', G, G', H, H', I, I' and J, J'. Such responses may be produced by three successive stages embodying network circuits 61 each slightly differently tuned to produce responses overlapping the responses of the preceding circuits. The system of Fig. 9, for example, may be employed to produce the responses illustrated in Fig. 10, merely by placing in the output stages of the amplifiers 5 a further pair of networks 61 tuned slightly differently from the networks in the output circuits of the amplifiers 1 and 3. The networks in the output circuits of the amplifiers 1, for example, may be tuned to have the respective responses E, E' and F, F' in the low- and high-frequency bands, producing resonance near the low limits of the bands and resonance intermediate the low- and high-frequency bands. The networks in the output circuits of the amplifiers 3 may be tuned to provide the responses G, G' and H, H' in the low- and high-frequency bands, the responses G and H occurring respectively at points near the low end of the respective bands, overlapping the respective responses E and F, and the resonances G' and H' occurring near the high ends of the respective bands, overlapping the responses E' and F'. Still a further similar circuit of the same character in the output circuit of the amplifier stages 5 may be tuned to produce respective low- and high-frequency responses I, I' and J, J', the responses I and J overlapping the respective responses G, E' and H, F' of the preceding circuits, intermediate the low- and high-frequency bands, and the resonances I' and J' occurring at the upper limits of the respective bands overlapping the falling or right-hand sides or edges of the responses G' and H'. Because the overall response of the individual circuits producing the resonances indicated in Fig. 10 is the result of the overlapping of these resonant peaks, very flat, wide-band response over the low- and high-frequency bands may thus be produced.

Numerous other combinations of double-resonant circuits and single resonant circuits, or pluralities of double resonant circuits may, of course, be employed, and the above examples are to be understood to be illustrative only of what are considered to be the preferred types out of the large number of different combinations and permutations that may, in practice, be achieved.

All of the double-resonance-producing circuits, above described, have produced double resonant responses in both the low- and high-frequency bands. This is not, of course, necessary, though for the purposes before described, it is deemed quite advantageous. Stages embodying appropriate networks may, for example, be provided to produce double resonance in a first frequency band and single resonance in the second frequency band. A further network stage may then produce double resonance in the second frequency band and single resonance in the first frequency band. In Fig. 11, as an example, are shown the responses of appropriate networks, one of which produces a double-resonant response A, A' in the low-frequency band and a single resonant response C' in the high-frequency band. A second appropriate circuit produces a single low-frequency response C in the low-frequency band intermediate and overlapping the respones A, A', and a double frequency response B, B' in the high-frequency band, overlapping the single frequency response C'. A circuit for producing the responses illustrated in Fig. 11 is shown in Fig. 12 where, once more, it is to be understood that the input circuits of the amplifier stages 1 and the output circuits of the amplifier stages 5 may have the form illustrated in Fig. 3.

The network output circuits of the amplifiers 1 of Fig. 12 are somewhat different than those previously described in connection with Figs. 3, 7 and 9. The series inductors 67 of Fig. 3 are shown connected in shunt in Fig. 12 and the inductor 109, for example, is not shown in Fig. 12. The condenser 45, moreover, is replaced by series-connected inductor 202. The network output circuits of the amplifiers 3 are also quite different from the output circuits discussed in Fig. 3. While containing the series-connected inductors 167 and the shunt-connected series-connected coils 177, the output circuits of the stages 3 of Fig. 12 embody also, a shunt-connected series condenser-and-coil combination 206, 210, and a further series-connected coil 204. Inter-electrode capacitances are shown dotted.

The performance of the circuit of Fig. 12 may be understood from the following considerations. In the low-frequency band, the output-circuit networks of the stages 1 comprise, effectively, a double-resonance producing circuit of the type discussed in connection with Fig. 6. The values of the elements 43 and 202 are selected such that at the low frequencies they present a very high impedance and may be considered, for practical purposes, as open-circuited. The networks then behave as if provided only with the inductance 67, the inductance 49 and the inductance 113, the inductance 67 being shunted by the output capacitance of the amplifiers 1 and the inductance 113, by the grid-to-cathode capacitance of the amplifiers 3. This $\pi$-type circuit, therefore, produces the double-resonance response A, A' shown in Fig. 11, in the low-frequency band. In the high-frequency band, the inductors 49 present an extremely high impedance and the condensers 43 present a very low impedance which may be treated as a short circuit. There is effectively presented to the high frequencies, therefore, a single tuned circuit comprising the series-connected inductor 202 and the inter-electrode capacitances of the tubes 1 and 3. Such a circuit has a single resonant response only and this may be tuned to a value C' intermediate the high-frequency band, as shown in Fig. 11. In connection with the output circuits of the amplifier stages 3, in the low-frequency band, the inductors 167, 204 and 206 may be considered as presenting negligible impedance and the effective circuit is, therefore, the parallel connection of the condenser 210 and the coils 177, shunted, in turn, on the two sides by the inter-electrode capacitance of the tubes 3 and 5. Such a circuit is, of course, resonant at only a single frequency and may be tuned to a point intermediate the low-frequency band, as shown at C in Fig. 11, to overlap the responses A, A' in the dip therebetween. In the high-frequency band, however, the condenser 210 may be considered as a short circuit and the inductors 177 as of extremely high impedance, so that the circuit reduces to a double-tuned type similar to that discussed in connection with Fig. 6, comprising the series-connected coil 167, the shunt-connected coil 206, the series-connected coil 204 and the interelectrode tube capacitances at either side. A double-resonant response B, B' may thus be provided in the high-frequency band, straddling or overlapping the response C' produced by the networks of the preceding stage. The overall response in the output circuit of the amplifier stages 5 will then be of precisely the same character shown in Fig. 2.

Not only, therefore, is the present invention not limited to double-resonance-producing circuits in both the low- and high-television bands, nor to the overlapping of the double and single resonant circuits, but, rather, to any desired combination of double resonance and/or single resonance effects, but the present invention is not even restricted to circuits that produce only double resonance effects in the respective widely separated bands. The invention is equally applicable to networks for producing more than two resonance responses in a particular band, and to the combining therewith of any desired type of overlapping responses. As an illustration, in accordance with the present invention, a network may be provided that presents a triple response in, for example, both the low- and high-frequency bands, as shown at A, A', A'' and B, B', B'' in Fig. 13. Such a circuit, by itself, may serve as a sufficient approximation to a substantially flat wide-band response over, for example, both the low- and high-television bands, that further overlapping resonance-producing circuits are, in some cases, not necessary. It is preferable, however, further to flatten the response by combining therewith, as still another example, the double-resonance responses K, K' and L, L' illustrated in Fig. 13. The resonance peaks K and K' may respectively overlap and fill the dips between the responses A, A' and A', A'', and the resonant peaks L, L' may respectively fill the dips between the responses B, B' and B' and B'' in the high-frequency band. A circuit that may be used for producing the responses illustrated in Fig. 13 is shown in Fig. 14.

In Fig. 14, the successive stages of push-pull amplification 1 and 3 are shown as individual triode tubes, but it is to be understood that the respective pairs of tubes may be embodied in the same envelope in the manner previously discussed in connection with the other embodiments of the invention. It is convenient, however, because of the complex nature of the networks of Fig. 14 to show these tubes, however, as separate elements. In the output circuits of the first stages of amplification 1, symmetrical networks are connected for producing the triple resonant responses in each of the low- and high-frequency bands shown in Fig. 13. Each network comprises elements similar to those previously discussed in connection with the system of Fig. 3, embodying the elements 43, 45, 49, 67, 95, 103 and 109. There are provided, in addition, however, further network components comprising the series-connected coils 247 and 241, and a further pair of series-connected condensers 243 and 245 similar to those shown in the output circuit of the stages 3 of Fig. 9. Shunting the series-connected condensers 243 and 245 is a coil 249, and connected between the junctions of the upper and lower series-connected condensers 243 and 245 is a further coil 209. Similarly connected between the junctions of the upper and lower condensers 245 and the coils 249 is a further coil 219. To these last-mentioned junctions the series-connected coils 47 and the coupling condensers 69 of Fig. 3 are connected to feed the control electrodes 23 and 27 of the upper and lower push-pull amplifiers 3. Connected between the junction of the upper and lower pairs of series-connected coils 241 and 247 is a parallel condenser-inductance circuit comprising the elements 240 and 242. The output circuits of the stages 3 are of substantially the same character as the output circuits of the stages 1 discussed in connection with the system of Fig. 3, embodying series-connected inductances 167, series condensers 343 and 345, and series inductors 257 connected to coupling condensers 269. Shunting the condensers 343 and 345 are coils 349, and connected between the junctions of the upper and lower coils 167 and condensers 343 are further inductors 177 through which B+ plate-supply voltage is applied to the stages 3. Connected between the junctions of the upper and lower condensers 343 and 345 is a coil 309, and connected between the junctions of the upper and lower condensers 345 and the coils 257 is a further coil 319. The network elements 167, 177, 257, 269, 309, 319, 343, 345 and 349 thus correspond, respectively, to the network elements 67, 103, 47, 69, 109, 113, 43, 45 and 49 of Fig. 3.

Since, therefore, the output circuits of the stages 3 are of the same character previously discussed in connection with the output networks of the stages 1 of Fig. 3, further explanation is not necessary of the operation of these output circuits other than to state that they are tuned to produce the doube resonant responses in each of the low- and high-frequency bands illustrated at K, K', L, L' in Fig. 13. The elements are tuned, however, to cause the peaks to occur at the dips in the triple resonant responses produced by the output circuits of the stages 1 of Fig. 14. The operation of the output-circuit networks of the stages 1 will now be explained. As before, because of the symmetry of the push-pull systems, only one-half of the circuit, say, the upper half, need be considered for purposes of illustration.

For the frequencies in the high-frequency band, the output networks of the stages 1 of Fig. 14 operate as if composed only of the elements shown in Fig. 15. The condensers 43, 45, 243 and 245 are adjusted to values such that they present substantially a short-circuit at the high frequencies, and the coils 103, 242 and 219 are of such value as to present sufficiently high impedances to be considered, for practical purposes, as infinite. The equivalent network then reduces, as shown in Fig. 15, to the shunt-connected effective inter-electrode capacitance 95 between the plate and grid of the upper tube of the stages 1, the series-connected coil 67, the shunt-connected coil 109, the series-connected coil 247, the shunt-connected capacitor 240, the series-connected inductor 241, the shunt-connected inductor 209, the series-connected inductor 47 and the shunt-connected input capacitance 97 of the upper section of the stages 3. There are thus provided, in effect, three sets of parallel-arranged capacitor-inductor tuned circuits. The elements may, of course, be adjusted as is well known, therefore, to provide three resonant peaks in the high-frequency band, as shown at B, B' and B'' in Fig. 13.

The equivalent network in the low-frequency band is illustrated in Fig. 16. The series-connected inductors 67 and 47 are of inductance values such that they present a negligible impedance to the frequencies in the low-frequency band. The capacitors 43, 45 and 243, 245, on the other hand, are of sufficiently high impedance that the effective impedance of these capacitors and their shunt-connected coils is the impedance of the shunt-connected coils 49 and 249 themselves. The equivalent network, therefore, comprises the parallel-connected tube capacitance 95 and inductance 103, the series-connected coils 49 and 247, the shunt-connected capacitor-inductance circuits 240, 242, the series-connected coils 241, 249, the shunt-connected coil 219 and the shunt-connected input-tube capacitance 97. This circuit, too, is of the three tuned-circuit type previously discussed in connection with Fig. 15 and therefore may be tuned to produce the three resonant peaks A, A' and A'' shown in the low-frequency band in Fig. 13.

The resultant wide-band overall responses of the circuits of Fig. 14, therefore, is of the nature illustrated, though not to scale, at I and II in Fig. 13, providing a somewhat less flat response than the resultant of the responses illustrated in Fig. 10, but a more uniform response than that illustrated in Fig. 2.

The present invention thus provides for the combination in a single stage of a plurality of resonant responses in a particular frequency band, and one or a plurality of frequency responses in a widely separated frequency band. By the expedient of this technique, as before explained in detail, there is combined in a single stage the function of a plurality of ordinary stages, thereby saving cost, size of equipment, and electric components. While, moreover, the discussion has been limited to double and triple responses, it is of course possible, by the very same techniques, to produce quadruple and also further numbers of responses. A composite network, for example, embodying networks of the stages 1 and 3 of Fig. 9 in a single stage may, for example, be employed for producing a quadruple response, and further responses may obviously be produced by further combinations of the networks herein discussed. Other well-known types of networks than those discussed may also be so employed.

The invention has been treated, moreover, in connection with two widely separated radio-frequency bands, namely a low-frequency and a high-frequency band such as those presently utilized for commercial television. The invention, however, is not so limited since, with appropriate circuit parameters, resonant responses may be made in three, four, or more widely separated radio-frequency bands. Three such wide-band responses may be accomplished, for example, by spreading out the separation of the peaks, in the triple resonance response of the circuit of Fig. 14. This spreading effect, accompanied by reducing the amplitude of the dips between the triple resonances to reject frequencies intermediate the peaks may be simply effected, as an illustration, by reducing the loading into which the networks feed. The same networks used in the output circuits of the stages 1 of Fig. 14 may thus feed reduced loads to cause the triple resonant responses A, A', A'' of Fig. 13 to spread out into the more widely separated resonant frequency bands A, A', A'' of Fig. 17. By following this network circuit with successive identical network circuits tuned to slightly different frequencies, as shown at B, B' and B'', and C, C' and C'' in Fig. 17, three resultant wideband responses may be produced over three relatively widely separated frequency bands, namely a low, a medium, and a high-frequency band. These resultant wide-band responses over three widely separated frequency bands are shown at I, II and III in Fig. 17, again not, however, to scale.

While the amplifying systems of the present invention have heretofore been treated as coupling widely separated bands of radio-frequency energy to a single receiver, these systems find great utility, also, in channeling or distributing such energy to a large number of separate receivers. In Fig. 18, as an example, the system of Fig. 3, 7, 9, 12 or 14 is shown connected to distribute amplified signals to a plurality of receiver channels, indicated for illustrative purposes as four receivers, a, b, c and d. While any type of distribution system may be employed, a preferred type embodying two pairs of impedance-transforming transmission-line elements 30 and 32 is shown. These transmission-line elements may be lecher lines or of any other variety, but, for television purposes, it is most convenient to employ so-called artificial lines of the elevator coil type. The two pairs of line elements 30 and 32 are preferably substantially quarter-wave lines to the frequencies in the low-frequency band and substantially three-quarter wave lines to the high-frequency band signals for purposes that will later be explained. The pair of line elements 32 are connected together at their upper or input terminals, and connected at their lower or output terminals to coaxial connectors 36 from which separate receivers b and c may be fed. The line elements 32 are electromagnetically coupled to the line elements 30, the upper or input terminals of which are connected to the respective coupling condensers 153 in the previously described broadly resonant output circuit of the final amplifier stages 5. Balanced anti-phase amplified output signals are thus fed to each transmission-line element 30, and through electromagnetic coupling to the corresponding transmission-line element 32. The output or lower terminals of the line elements 30 are connected to coaxial connectors 34 from which receivers a and d may be fed. The outer conductor of each of the coaxial connectors 34, 36 is at a common reference potential such as ground. With the previously described line dimensions, while the transmission lines 30, 32 may present, for example, a three hundred-ohm load to the output circuits of the stages 5, there appears at each of the output transmission-line coaxial connectors 34, 36 a markedly lower impedance of seventy-five ohms with respect to ground, so that to the connectors 34, 36 may be joined conventional seventy-five ohm coaxial lines for energizing the respective receivers. Since moreover, there will be developed in each pair of transmission lines 30, 32 one half the signal output of the stages 5, one quarter of each signal will ultimately appear in each of the four receivers a, b, c and d. It will be observed, furthermore, that the input or upper terminals of the line elements 30 are connected together through a condenser C, indicated as variable. Whereas in the system of Fig. 3 the output circuit 157, 155, 153 was made broadly resonant through cooperation with the distributed capacitance of the switch S and terminals 54, as before described in detail, the condenser C is desirable to serve this same purpose in the distribution-system circuit of Fig. 18, and it is preferably variable to permit maintaining optimum performance.

Further modifications will occur to those skilled in the art and all such are considered to fall within the spirit and scope of the present invention as defined in the appended claims.

What is claimed is:

1. An electric system for amplifying a plurality of separate radio-frequency signals within widely separated low and high relatively wide radio-frequency bands having, in combination, a first tuned amplifying means comprising a first plural-resonant network having at least three resonant-peak narrow-band responses and connected with a first amplifier apparatus, the network being tuned to position at least a pair of its resonant-peak responses in the said relatively wide low radio-frequency band and at least one of its remaining resonant-peak responses in the said relatively wide high radio-frequency band, a second tuned amplifying means comprising a second plural-resonant network having plural resonant-peak narrow-band responses and connected with a second amplifier apparatus, the second network being tuned to position at least one of its resonant-peak responses in the said relatively wide low radio-frequency band and at least a second resonant-peak response in the said relatively wide high radio-frequency band but with the responses of the second network in the low and high radio-frequency bands displaced respectively with reference to the responses of the first network in the respective low and high radio-frequency bands in order that the plural resonant responses of the networks may overlap within the respective low and high radio-frequency bands, means for connecting together the first and second amplifying means to produce simultaneously a resultant broad-band amplification in each of the low and high radio-frequency bands, means for connecting input signals to one of said amplifying means, and means for deriving the output signals of said system from the other of said amplifying means.

2. An electric system for amplifying a plurality of separate radio-frequency signals within widely separated low and high relatively wide radio-frequency bands having, in combination, a first tuned amplifying means comprising a first plural-resonant network having at least three resonant-peak narrow-band responses and connected with a first amplifier apparatus, the network being tuned to position at least a pair of its resonant-peak response in the said relatively wide high radio-frequency band and position at least a pair of its resonant-peak responses in the said relatively wide low radio-frequency band, a second tuned amplifying means comprising a second plural-resonant network having plural resonant-peak narrow-band responses and connected with a second amplifier apparatus, the second network being tuned to position at least one of its resonant-peak responses in the said relatively wide low radio-frequency band and at least a second resonant-peak response in the said relatively wide high radio-frequency band but with responses of the second network in the low and high radio-frequency bands displaced respectively with reference to the responses of the first network in the respective low and high radio-frequency bands in order that the plural resonant responses of the networks may overlap within the respective low and high radio-frequency bands, means for connecting together the first and second amplifying means to produce simultaneously a resultant broad-band amplification in each of the low and high radio-frequency bands, means for connecting input signals to one of said amplifying means, and means for deriving the output signals of said system from the other of said amplifying means.

3. An electric system for amplifying a plurality of separate radio-frequency signals within widely separated low and high relatively wide radio-frequency bands having, in combination, a first tuned amplifying means comprising a first plural-resonant network having at least three resonant-peak narrow-band responses and connected with a first amplifier apparatus, the network being tuned to position a pair of its resonant-peak responses in one of the said relatively wide radio-frequency and at least one of its remaining resonant-peak responses in the other of the said relatively wide radio-frequency bands, a second tuned amplifying means comprising a second plural-resonant network having plural resonant-peak narrow-band responses and connected with a second amplifier apparatus, the second network being tuned to position at least one of its resonant-peak responses in the said relatively wide low radio-frequency band and at least a second resonant-peak response in the said relatively wide high radio-frequency band but with the responses of the second network in the low and high radio-frequency bands displaced respectively with reference to the responses of the first network in the respective low and high radio-frequency bands in order that the plural resonant responses of the networks may overlap within the respective low and high radio-frequency bands, means for connecting together the first and second amplifying means to produce simultaneously a resultant broadband amplification in each of the low and high radio-frequency bands, means for connecting input signals to one of said amplifying means, and means for deriving the output signals of said system from the other of said amplifying means.

4. An electric system for amplifying a plurality of separate radio-frequency signals within widely separated low and high relatively wide radio-frequency bands having, in combination, a first tuned amplifying means comprising a first pair of similar push-pull-connected plural-resonant networks each having at least three resonant-peak narrow-band responses and connected with a first push-pull amplifier apparatus, each network being tuned to position at least a pair of its resonant-peak responses in one of the said relatively wide radio-frequency bands and at least one of its remaining resonant-peak responses in the other of the said relatively wide radio-frequency bands, a second tuned amplifying means comprising a second pair of similar push-pull-connected plural-resonant networks connected with a second push-pull amplifier apparatus, each of the second networks being tuned to position at least one of its resonant-peak responses in the said relatively wide low radio-frequency band and at least a second resonant-peak response in the said relatively wide high radio-frequency band but with the responses of each of the second pair of networks in the low and high radio-frequency bands displaced respectively with reference to the responses of each of the first pair of networks in the respective low and high radio-frequency bands in order that the plural resonant responses of the pairs of networks may overlap within the respective low and high radio-frequency bands, means for connecting together the first and second amplifying means to produce simultaneously a resultant broadband push-pull amplification in each of the low and high radio-frequency bands, means for connecting input signals to one of said amplifying means, and means for deriving the output signals of said system from the other of said amplifying means.

5. An electric system as claimed in claim 3 and in which the first plural-resonant network of the first tuned amplifying means comprises a quadruple resonant-peak network.

6. An electric system as claimed in claim 5 and in which the second plural-resonant network of the second tuned amplifying means comprises a further quadruple resonant-peak network tuned to position the four resonant-peak narrow-band responses thereof to overlap respectively one of the responses of the first-named quadruple resonant-peak network.

7. An electric system as claimed in claim 5 and in which the second plural-resonant network of the second tuned amplifying means comprises a double resonant-peak network tuned to position each of the two resonant-peak narrow-band responses thereof to overlap at least one of responses of the said quadruple resonant-peak network.

8. An electric system as claimed in claim 3 and in which the first plural-resonant network is a triple resonant-peak network.

9. An electric system as claimed in claim 3 and in which the said first plural-resonant network comprises a quadruple resonant-peak network with the resonant-peak narrow-band responses tuned to about 54, 88, 174 and 216 megacycles, and the second plural-resonant network comprises a double resonant-peak network with the resonant-peak narrow-band responses tuned to about 70 and 200 megacycles.

10. An electric system as claimed in claim 4 and in which each of the pair of networks of one of the tuned amplifying means comprises a quadruple resonant-peak network.

References Cited in the file of this patent

UNITED STATES PATENTS

| Number | Name | Date |
|---|---|---|
| 1,438,828 | Houck | Dec. 12, 1922 |
| 1,603,806 | Riegger | Oct. 19, 1926 |
| 1,897,633 | Dalpayrat | Feb. 14, 1933 |
| 1,938,620 | Braden | Dec. 12, 1933 |
| 1,938,639 | Posthumus et al. | Dec. 12, 1933 |
| 1,945,096 | Tellegen | Jan. 30, 1934 |
| 2,133,808 | Carlson | Oct. 18, 1938 |
| 2,167,079 | Landon | July 25, 1939 |
| 2,261,803 | Grundmann | Nov. 4, 1941 |
| 2,422,087 | Everett | June 10, 1947 |
| 2,544,508 | Mackey | Mar. 6, 1951 |
| 2,606,284 | Van Weel | Aug. 5, 1952 |

FOREIGN PATENTS

| 668,337 | Germany | Dec. 1, 1938 |
|---|---|---|

OTHER REFERENCES

Text book, Vacuum Tube Amplifiers, Valley and Wallman, Radiation Lab. Series, 1948; McGraw-Hill Book Co.; chapter V, pp. 201–231. (Copy in Div. 69.)